United States Patent
Ryu et al.

(10) Patent No.: US 6,842,216 B1
(45) Date of Patent: Jan. 11, 2005

(54) COATING METHOD OF FORMING ORIENTATION FILM OF PREDETERMINED PATTERN

(75) Inventors: Jae-Choon Ryu, Kyoungsangbuk-do (KR); Joung-Ho Ryu, Kyoungsangbuk-do (KR)

(73) Assignee: LG. Philips LCD Co., Ltd., Seoul (KR)

( * ) Notice: Subject to any disclaimer, the term of this patent is extended or adjusted under 35 U.S.C. 154(b) by 127 days.

(21) Appl. No.: 09/667,763

(22) Filed: Sep. 22, 2000

(30) Foreign Application Priority Data

Sep. 27, 1999 (KR) .............................. 99-41242

(51) Int. Cl.$^7$ .................. G02F 1/13; G02F 1/1337; B05D 5/12
(52) U.S. Cl. ............... 349/187; 349/123; 349/124; 427/96
(58) Field of Search ................. 349/123, 124, 349/187, 155; 427/96, 356; 118/410

(56) References Cited

U.S. PATENT DOCUMENTS

| | | | |
|---|---|---|---|
| 5,046,822 A | * | 9/1991 | Matsuda et al. ............ 349/135 |
| 5,538,754 A | * | 7/1996 | Sandock ....................... 427/96 |
| 5,879,851 A | * | 3/1999 | Takahashi et al. .......... 430/149 |
| 6,261,856 B1 | * | 7/2001 | Shinohara et al. .......... 438/166 |
| 6,436,472 B1 | * | 8/2002 | Sago et al. .................. 427/240 |

OTHER PUBLICATIONS

Slitcoater Model CFPR R–119S visual presentation materials from Tokyo Ohka Kegyo Co., Ltd., Coater Development Section Equipment Development Division, Sep. 1996.*

Slitercoater Model CFPR R–119S visual presentation materials from Tokyo Ohka Kogyo Co., Ltd., Coater Development Section Equipment Development Division, Sep. 1997.

* cited by examiner

Primary Examiner—Dung T. Nguyen
Assistant Examiner—Jeanne Andrea Di Grazio
(74) Attorney, Agent, or Firm—Birch, Stewart, Kolasch & Birch, LLP

(57) ABSTRACT

The present invention discloses a method of forming an orientation film on a substrate, including: providing the substrate on a stage; positioning a slit coater having a slit nozzle on the substrate; and spraying an orientation material on the substrate through the slit nozzle of the slit coater.

8 Claims, 3 Drawing Sheets

COATING METHOD OF FORMING ORIENTATION FILM OF PREDETERMINED PATTERN

CROSS REFERENCE

This application claims the benefit of Korean Patent Application No. 1999-41242, filed on Sep. 27, 1999, under 35 U.S.C. § 119, the entirety of which is hereby incorporated by reference.

BACKGROUND OF THE INVENTION

1. Field of the Invention

The present invention relates to a liquid crystal display device, and more particularly, to a method of forming an orientation film of a liquid crystal display (LCD) device.

2. Description of Related Art

A typical LCD device includes lower and upper substrates with a liquid crystal layer interposed therebetween. The lower substrate has a thin film transistor (TFT) as a switching element and a pixel electrode, and the upper substrate has a color filter and a common electrode. The pixel electrode serves to apply a voltage to the liquid crystal layer along with the common electrode, and the color filter serves to implement natural colors.

A manufacturing process of the LCD device is explained below. First, the lower substrate is prepared. On the lower substrate, a plurality of thin film transistors and pixel electrodes are arranged in a one-to-one arrangement. To form the orientation film on the lower substrate, the surface of the lower substrate is coated with an organic film such as a polyimide, and the orientation film is rubbed in a direction. It is desirable that the orientation film is formed to keep a uniform thickness of the whole surface over the lower substrate. The rubbing is performed normally by using a cloth. Aligned on the orientation film, the liquid crystal molecules orient themselves uniformly in the direction of the rubbing. By the rubbing treatment of the orientation film, liquid crystals can be driven normally, and uniform display characteristics can be obtained. Then, sealant is applied in a picture-frame-like pattern, either by means of screen-printing or dispensing. Sealant is required in order to make a liquid crystal cell from two substrates. In addition to sealing the liquid crystal, sealant protects the liquid crystal from contamination from external sources such as the penetration of water, and from environmental changes. Next, spacers are sprayed to keep a uniform cell gap between the lower and upper substrates. Important requirements are producing uniform spraying over the entire substrate, controlling the spacer density (number of spacers per unit area), and preventing the formation of lumps. The spraying technique includes a wet method of spraying spacers and a dry method of spraying spacers. The wet method of spraying spacers involves the following steps: diffusing spacers in a low-boiling-point organic solvent, such as freon or alcohol, through the use of ultrasonic waves; spraying the spacer-diffused liquid; and drying the panel in order to evaporate the solvent. In the dry method, spacers are applied electrostatically or diffused by means of an air-jet. When TFT-LCDs are handled, measures should be taken to prevent a static electricity. In addition, freon, alcohol, and other organic solvents are subject to density control. Because of this, the dry or air-jet diffusion method is mainly used. Sequentially, two substrates are assembled with and attached to each other. Alignment of the two substrates depends on alignment error, can be several micrometers. When the two substrates are aligned with each other beyond alignment error, since light leakage may occur, desirable display characteristics cannot be obtained. The next step is a cell-cutting process. The liquid crystal cell manufactured through the foregoing five steps is cut into a unit cell. The liquid crystal cell undergoes the cell-cutting process after a plurality of liquid crystal cells is formed on the large-sized glass substrate. The cell-cutting process includes a scribing process that forms a cutting line on a surface of the substrate with a pen of a diamond having a higher hardness than the glass substrate, and a breaking process that breaks the liquid crystal cell into unit cells. Then, a liquid crystal is injected into the gap between the two substrates. The unit liquid crystal cell generally has an area of hundreds of $cm^2$ and a gap of several micrometers ($\mu m$). A vacuum injecting method, which uses a pressure difference between inside and outside of the cell fills the liquid crystal between the two substrates, for example.

At this point, the orientation film is essential to the LCD device. The LCD device displays images by using the dielectric constant anisotropy of liquid crystal molecules and by changing their orientation through the application of a voltage. A critical element of the LCD device is the ability to control the orientation and the pretilt angle of the liquid crystal molecules for a given operating mode. The orientation film is designated to perform these functions.

FIG. 1 shows a conventional method of forming the orientation film. As shown in FIG. 1, an equipment of coating an orientation film includes a doctor roll 11, an anilox roll 13, a printing roll 15, and a rubber pad 17 attached on the printing roll 15. The doctor roll 11 is geared with the anilox roll 13, and the anilox roll 13 is also geared with the printing roll 15 for rotation. The anilox roll 13 has fine grooves 13a on its surface. The rubber pad 17 has embossment patterns (⊥) on its one surface.

In order to form the orientation film, first, an array substrate 10 is provided on a stage 12. When the coating equipment is operated, the doctor roll 11 rotates with the anilox roll 13 geared therewith, spraying an orientation material. The sprayed orientation material is deposited into the fine grooves of the anilox roll 13 Subsequently, an orientation material deposited in the grooves of the anilox roll 13 is transferred to the rubber pad 17 of the printing roll 15, with the anilox roll 13 rotating with the printing roll 15 geared therewith. Thereafter, an orientation material transferred to the rubber pad 17 is coated on the glass substrate 10 in the form of the patterns (⊥) of the rubber pad 17 while the printing roll 15 rotates. The orientation material is coated on rest regions of the substrate other than a sealant region and a pad region.

However, the conventional method of forming the orientation film requires preparatory proceedings including attaching the rubber pad to the printing roll and cleaning the rolls. If the cleaning process is not cleanly carried out, owing to contamination, spots may take place on the substrate on which the orientation film is formed, or pinholes may occur during a hardening process, thereby lowering manufacturing yields. Further, since the anilox roll 13 has the fine grooves on its surface, the anilox roll 13 is badly worn if it is used during a certain period, so that a shape of the fine grooves may be transformed. Therefore, after a certain period, the doctor roll 11 and the anilox roll 13 should be replaced. Therefore, during replacement of the doctor roll 11 and the anilox roll 13 subsequent processes cannot be performed. Besides, since the rubber roll 17 is lower in hardness than other components of the coating equipment, the life span of the rubber pad is short and also its emboss patterns should be changed according to the model. Therefore, operation efficiency becomes lowered and a production cost also becomes high.

SUMMARY OF THE INVENTION

To overcome the problems described above, preferred embodiments of the present invention provide a method of forming an orientation film of a liquid crystal display device, which has a high manufacturing yield, a high operation efficiency and a low production cost.

In order to achieve the above object, a preferred embodiment of the present invention provides a method of forming an orientation film on a substrate, including providing the substrate on a stage; positioning a slit coater having a slit nozzle and an orientation material, the slit nozzle being at a predetermined distance from the substrate; and spraying the orientation material on the substrate through the slit nozzle of the slit coater.

A thickness of the orientation film is about 0.8 μm to about 1.0 μm. The slit coater sprays an orientation material out of the slit nozzle to have a surface tension.

The method of forming an orientation film on a substrate further includes providing at least one laser device irradiating a laser beam; and patterning predetermined portions of the orientation film using the laser beam. The laser beam is an eximer laser.

By using a method of coating the orientation film on the substrate according to the preferred embodiment of the present invention, defective rates such as a spot of the orientation film and a pinhole are lowered. Further, an operating rate is improved because a continuous production is possible. Since components replaced are small in number, a production cost is low and a manufacturing yield is high.

BRIEF DESCRIPTION OF THE DRAWINGS

For a more complete understanding of the present invention and the advantages thereof, reference is now made to the following descriptions taken in conjunction with the accompanying drawings, in which like reference numerals denote like parts, and in which.

DETAILED DESCRIPTION OF PREFERRED EMBODIMENTS

Reference will now be made in detail to a preferred embodiment of the present invention, an example of which is illustrated in the accompanying drawings.

Figure 1:
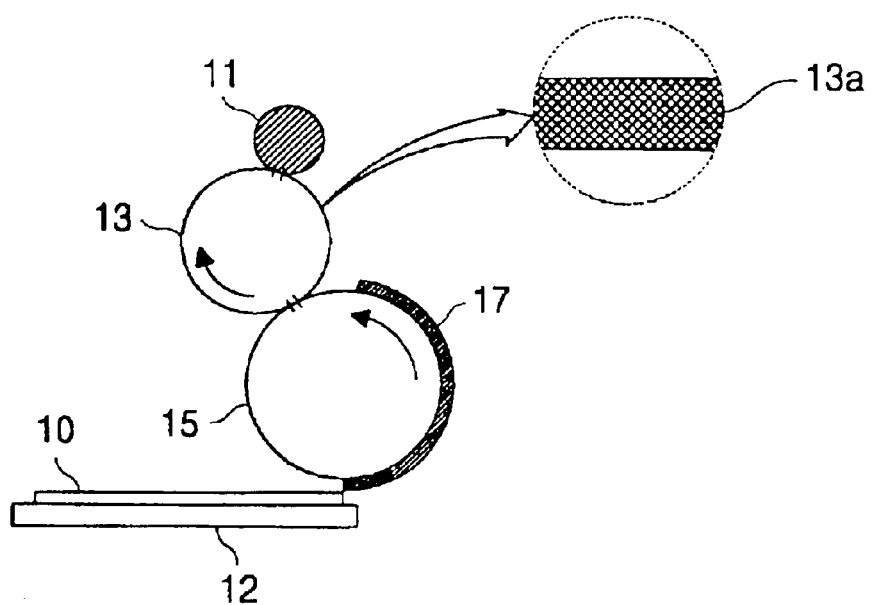
FIG. 1 shows a conventional method of coating an orientation film on a substrate.
Figure 2:
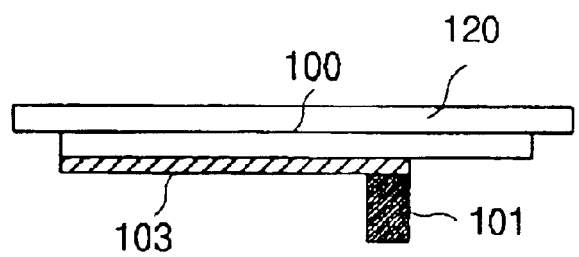
FIG. 2 shows a method of coating an orientation film on a substrate according to a preferred embodiment of the present invention.
Figure 3A:
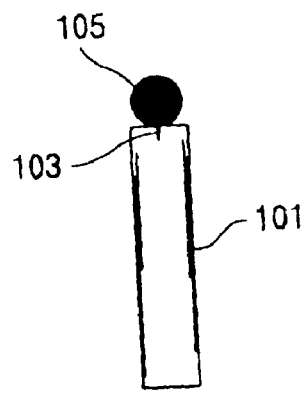
FIG. 3A is a side view illustrating a slit coater according to the preferred embodiment of the present invention.
Figure 3B:
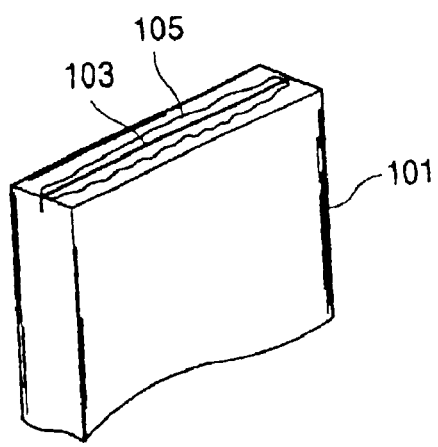
FIG. 3B is a perspective view illustrating the a slit coater according to the preferred embodiment of the present invention.

FIG. 2 is a side view illustrating a method of coating an orientation film according to the preferred embodiment of the present invention. As shown in FIG. 2, a slit coater 101 is used as coating equipment. The slit coater 101 is a general coating device that has been usually used to coat a photoresist, a pigment of color filter, an organic insulating layer and the like. As an example of the slit coater 101, there is a model "CFPR R-119S" available from a Japanese company "TOK (Tokyo Ohka Kogyo)". As shown in FIGS. 3A and 3B, the slit coater 101 includes a slit nozzle 103. The slit coater 101 sprays an orientation material through the slit nozzle 103. Preferably, an orientation material 105 is sprayed to keep a surface tension. To keep a surface tension of the orientation material, a speed that the orientation material is effused is preferably greater than one that a slit coater 101 moves. Therefore, when the orientation material 103 is coated on a substrate 100, due to a surface tension, the orientation material is not separated from the substrate 100 and keeps its uniform thickness.

To coat the orientation material on the substrate 100, first the substrate 100 is located on a stage 120 and then is turned upside down. The slit coater 101 is located to be at a predetermined distance from the substrate 100 in the light of a thickness of the orientation film. Thereafter, the slit coater 101 moves along the substrate 100, spraying the orientation material on the substrate 100. Preferably, a thickness of the orientation film formed is about 0.8 μm to about 1.0 μm in the light of a surface tension of the orientation material. Preferably, a uniformity error of the orientation film is ±5%.

Figure 4:
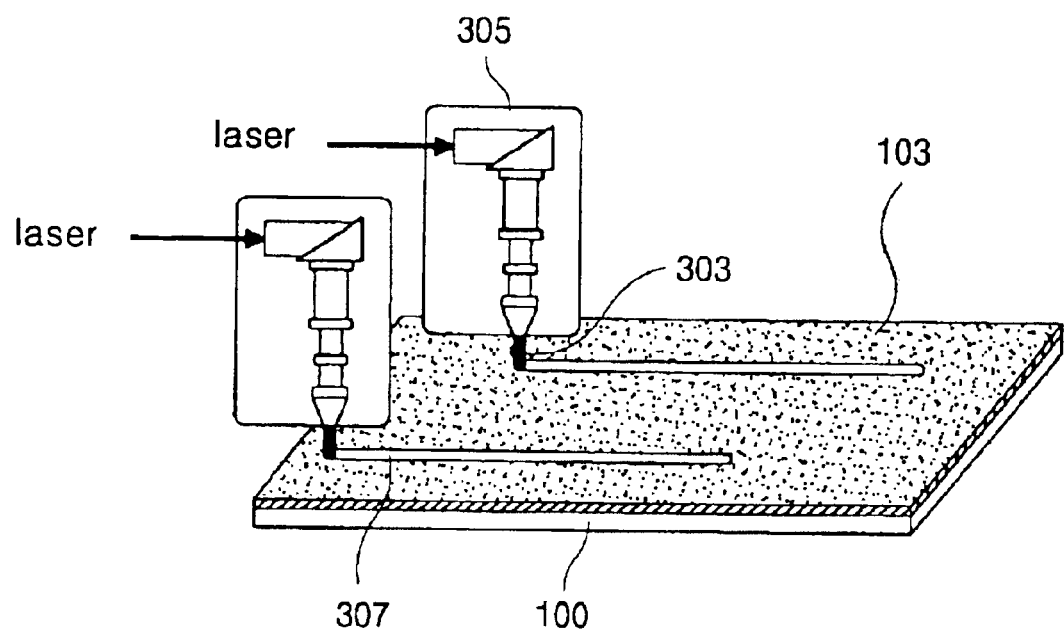
FIG. 4 shows a method of forming a pattern of the orientation film according to the preferred embodiment of the present invention.

FIG. 4 shows a process of forming a predetermined pattern on the substrate on which the orientation film is formed. The patterning process is one which removes orientation film 104 on regions that the pad portion is formed and that a sealant is printed. As shown in FIG. 4, an eximer laser device is usually used to form a predetermined pattern 307 of the orientation film 103 on the substrate. However, as a device to form a pattern of the orientation film, any other high-power laser beam device(s) may be used. FIG. 4 shows only a beam head 305 of the eximer laser device. The beam head 305 irradiates a laser beam 303 to form the pattern 307 with a predetermined angle. A robot programmed to move along a pattern controls the beam head 305. A plurality of the beam heads 305 may be used for formation of the patterns 307. Since the laser beam 303 processes the orientation film on the substrate 100 non-thermally and only the orientation film of a certain pattern can be removed without any damage of portions of the orientation film other than a pattern and the substrate 100, it is easy to form the pattern 307 of the orientation film compared with the conventional art. Since the laser beam is not affected by the surroundings, a process of forming the pattern of the orientation film is possible in the atmosphere.

As described herein before, by using a method of coating the orientation film on the substrate according to the preferred embodiment of the present invention, defects such as a spot of the orientation film and a pinhole are lowered. Further, operation efficiency is improved because a continuous production is possible. Since replaced components are small or few, a production cost is low and a manufacturing yield is high.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A method of forming an orientation film on a substrate comprising:

providing a substrate on a stage, said substrate facing downwardly from a bottom-facing surface of said stage;

positioning a slit coater having a slit nozzle adjacent to and spaced from the substrate a distance corresponding to the desired thickness of said orientation film;

spraying an orientation material having a surface tension on the substrate through the slit nozzle of the slit coater while maintaining the surface tension of the orientation material, said orientation material being coated on said stage at a speed which maintains said surface tension, and patterning an orientation pattern at a predetermined portion of the orientation material using a laser beam.

2. The method of claim 1, wherein the thickness of the orientation material ranges from about 0.8 $\mu$m to about 1.0 $\mu$m.

3. The method of claim 1, wherein the slit nozzle is maintained at a predetermined distance from the substrate.

4. The method of claim 1, wherein the predetermined portions of the orientation material include a spraying surface of the orientation material.

5. The method of claim 1, wherein the laser is an eximer laser.

6. The method of claim 1, further comprising rubbing the orientation material.

7. The method of claim 6, wherein the step of rubbing is performed after spraying.

8. The method of claim 6, wherein the rubbing is performed after forming an orientation pattern.

* * * * *